United States Patent
Hehle et al.

(10) Patent No.: US 7,769,530 B2
(45) Date of Patent: Aug. 3, 2010

(54) PROCESS FOR THE OPEN- AND CLOSED-LOOP CONTROL OF AN INTERNAL COMBUSTION ENGINE WITH A COMMON RAIL SYSTEM INCLUDING INDIVIDUAL ACCUMULATORS

(75) Inventors: Marc Hehle, Constance (DE); Albert Kloos, Friedrichshafen (DE); Jörg Remele, Hagnau (DE); Günther Schmidt, Friedrichshafen (DE); Ralf Speetzen, Friedrichshafen (DE); Michael Walder, Ravensburg (DE); Michael Willmann, Bermatingen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 117 days.

(21) Appl. No.: 12/284,766

(22) Filed: Sep. 25, 2008

(65) Prior Publication Data

US 2010/0076665 A1  Mar. 25, 2010

(30) Foreign Application Priority Data

Sep. 25, 2007  (DE) ................... 10 2007 045 606

(51) Int. Cl.
*F02M 65/00* (2006.01)
*F02M 57/02* (2006.01)
*G01M 15/00* (2006.01)

(52) U.S. Cl. .................................... 701/105; 123/446

(58) Field of Classification Search ......... 701/102–105, 701/112; 123/299, 674, 446, 456
See application file for complete search history.

(56) References Cited

U.S. PATENT DOCUMENTS

| 4,777,921 | A | * | 10/1988 | Miyaki et al. ............... 123/456 |
| 5,678,521 | A | * | 10/1997 | Thompson et al. ........... 123/446 |
| 6,088,647 | A | | 7/2000 | Hemberger et al. |
| 6,517,170 | B1 | * | 2/2003 | Hofsaess et al. ............... 303/11 |
| 7,272,486 | B2 | | 9/2007 | Speetzen et al. |
| 7,305,972 | B2 | * | 12/2007 | Kloos et al. .................. 701/105 |
| 7,493,887 | B2 | * | 2/2009 | Kloos et al. .................. 123/456 |
| 2003/0121501 | A1 | | 7/2003 | Barnes et al. |
| 2006/0266332 | A1 | * | 11/2006 | Kloos et al. .................. 123/446 |

(Continued)

FOREIGN PATENT DOCUMENTS

DE        19740608        3/1999

(Continued)

*Primary Examiner*—Stephen K Cronin
*Assistant Examiner*—Arnold Castro
(74) *Attorney, Agent, or Firm*—Lucas & Mercanti, LLP; Klaus P. Stoffel

(57) ABSTRACT

For an internal combustion engine with a common rail system including individual accumulators, a process for open- and closed-loop control is proposed, in which the individual accumulator pressure (pE) is detected within a measuring interval and stored, an absolute minimum value of the stored individual accumulator pressure (pE) is interpreted as the end of the main injection, and on the basis of the end of the main injection, a mathematical function is used to calculate a virtual starting time for the main injection. In the measuring interval after the end of the main injection, the individual accumulator pressure (pE) is filtered within a time window, a local minimum value of the filtered individual accumulator pressure is interpreted as the end of a post-injection, and a mathematical function is used to calculate a virtual start of the post-injection.

11 Claims, 6 Drawing Sheets

U.S. PATENT DOCUMENTS

2008/0027624 A1* 1/2008 Kloos et al. .................. 701/103
2009/0223488 A1* 9/2009 Dolker ........................ 123/456

FOREIGN PATENT DOCUMENTS

| | | |
|---|---|---|
| DE | 10302806 | 8/2004 |
| DE | 10344181 | 4/2005 |
| DE | 102006007365 | 5/2007 |

* cited by examiner

PROCESS FOR THE OPEN-AND CLOSED-LOOP CONTROL OF AN INTERNAL COMBUSTION ENGINE WITH A COMMON RAIL SYSTEM INCLUDING INDIVIDUAL ACCUMULATORS

BACKGROUND OF THE INVENTION

The invention relates to a process for the open-and closed-loop control of an internal combustion engine with a common rail system including individual accumulators.

An internal combustion engine with a common rail system together with individual accumulators and a controlling and regulating process are known from DE 103 44 181 A1. The process consists of a first step in which the individual accumulator pressure is detected and stored within a measuring interval such as one operating cycle of the internal combustion engine corresponding to a crankshaft angle of 720°. In the second step, the absolute minimum value is determined from the stored values. The absolute minimum value is equivalent to the end of the main injection. In the third step, an intermediate value is calculated on the basis of the maximum pressure value. Then, in the fourth step, a mathematical function such as a straight-line equation is used to calculate a virtual starting time for the main injection on the basis of the end of the main injection and the intermediate value. The further open- and closed-loop control of the internal combustion engine then proceeds on the basis of the virtual injection staring time, which is set as the actual starting time. There is no information to be derived from this source concerning pre-injection or post-injection in a common rail system with individual accumulators.

DE 10 2006 007 365 B3 describes a process for detecting the end of a main injection in an internal combustion engine with a common rail system including individual accumulators. In this process, the individual accumulator pressure is again determined within a measuring interval and stored. This process is based on the realization that, during the measuring interval, the change in pressure in the individual accumulator has a falling branch, i.e., injection activated, and a rising branch, i.e., injection deactivated. Thus the end of the main injection must lie at the connecting point between the rising and falling branches. In concrete terms, the process consists of a step in which, proceeding from a first pressure level of the individual accumulator pressure, a check is made to see whether two measurement values have been determined. If this is so, the process is repeated at a lower pressure-level. This recursion process is repeated until only one measurement value or no measurement value is determined. This is the case only at the end of the injection or when the end of injection occurred shortly before. A virtual start of injection is calculated on the basis of the end of the main injection in a way similar to that described in the previously mentioned DE 103 44 181 A1, and this value is taken as the actual start of injection for the further open- and closed-loop control of the internal combustion engine. No information on pre-injection or post-injection in a common rail system with individual accumulators can be found in this source either.

In the case of multiple post-injections in a common rail system with individual accumulators, the problem occurs in practice that the individual accumulator pressure has a great deal of waviness during post-injection. These oscillations of the fuel pressure in the individual accumulator are caused by the mechanical closing of the injector needle. Because the amplitudes of the desired signal, that is, the theoretical curve of the individual accumulator pressure, and the amplitudes of the superimpositions, i.e. the amplitudes of the pressure oscillations responsible for the "waviness", are of similar magnitude, incorrect conclusions can be drawn concerning the points at which a post-injection starts and ends.

SUMMARY OF THE INVENTION

The invention is therefore based on the object of expanding the process to cover pre-injection and post-injection in an internal combustion engine with a common rail system including individual accumulators.

The inventive process is based on the previously measured and stored pressure values of the individual accumulator. After the end of injection and the virtual start of injection of the main injection process have been determined, the individual accumulator pressure is filtered within a time window during the measuring interval after the end of the main injection. From the filtered individual accumulator pressure, a local minimum value is determined, and this value is interpreted as the end of the post-injection. On the basis of the end of the post-injection, a mathematical function such as a linear equation is then used to calculate a virtual start of the post-injection. The time window begins with the end of the main injection and ends either when the individual accumulator pressure becomes equal to the rail pressure or when a time step expires. Alternatively, the time window begins upon expiration of a delay time.

If the electronic control unit has initiated multiple post-injections, then, in correspondence with the number of initiated multiple post-injections, the corresponding ends and virtual starts of the post-injections are determined within the time window on the basis of the filtered individual accumulator pressure.

If the injection process also includes a pre-injection, a local minimum of the individual accumulator pressure in the time period between the start of the measuring interval and the calculated virtual start of the main injection is interpreted as the end of the pre-injection. A mathematical function is then used to calculate a virtual start of the pre-injection.

The individual accumulator pressure is filtered through an tunable filter such as a comb filter, the characteristics of which are determined by way of a Fourier transformation, a model, or a characteristic diagram. The input variables of the characteristic diagram are the same as the characteristic values of the oscillation, e.g., the oscillation of the rail pressure.

In one embodiment, it is provided that, after an end and a virtual start of the main injection have been calculated from the unfiltered individual accumulator pressure, the individual accumulator pressure is filtered in the crankshaft angle range between the virtual start and the end of the main injection. An absolute minimum value of the filtered individual accumulator pressure within the range is interpreted as the end of the filtered main injection. A mathematical function is then used to calculate a virtual start of the filtered main injection. The virtual start of the filtered main injection is used as a reference point for the determination of the end of the pre-injection. The end of the filtered main injection is used as a reference point for the determination of the post-injection or post-injections.

The inventive process is characterized by a high degree of reliability; that is, the determined end of the post-injection and the virtual start of the post-injection or of the pre-injection calculated from it are clearly reproducible. This high reliability has a positive effect on the emission values, i.e., it reduces them. Because the invention requires no additional sensors, it can be offered as an upgrade solution.

Other features and advantages of the present invention will become apparent from the following description of the invention.

DETAILED DESCRIPTION OF THE INVENTION

Figure 1:
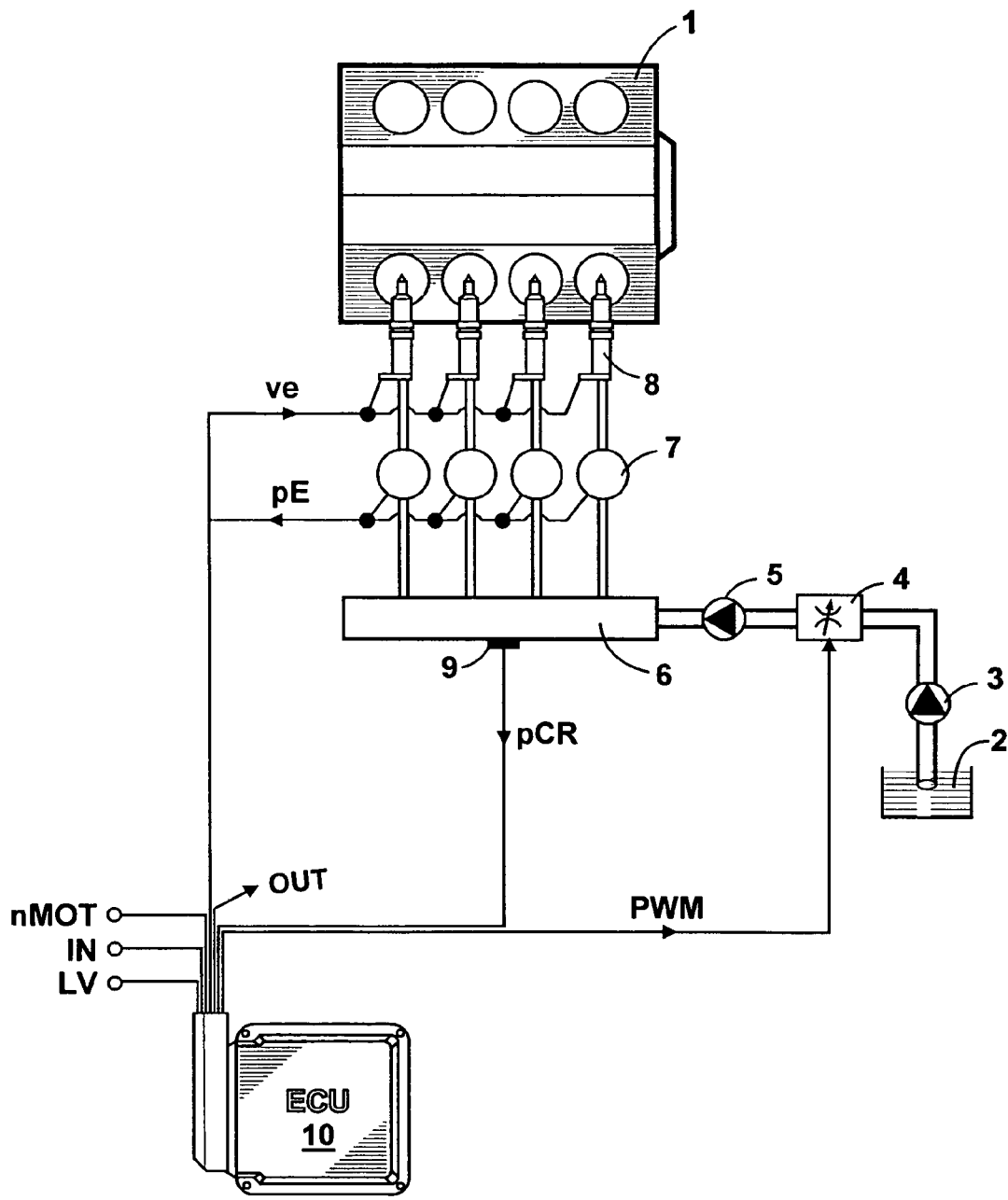
FIG. 1 shows a system diagram.

FIG. 1 shows a system diagram of an electronically controlled internal combustion engine 1. In this engine, the fuel is injected via a common rail system. This comprises the following components: a low-pressure pump 3 for delivering the fuel from a fuel tank 2; a suction throttle 4 for determining the volume flow rate; a high-pressure pump 5 for conveying the fuel into the rail 6 while increasing its pressure; individual accumulators 7 for the intermediate storage of the fuel; and injectors 8 for injecting the fuel into the combustion chambers of the internal combustion engine 1.

The common rail system with individual accumulators differs from a conventional common rail system in that the fuel to be injected is taken from the individual accumulators 7, where the energy for an injection comes from the elasticity of the volume of fuel present in the individual accumulator. The feed line leading from the rail 6 to the individual accumulator 7 is designed in practice so that the feedback of interference frequencies, i.e. pressure oscillations, into the rail is damped. During the pause between injections, just enough additional fuel flows from the rail 6 to fill the individual accumulator 7 again by the time the next injection starts. By the time the injection starts, the pressure in the individual accumulator 7 has become equal again to the rail pressure pCR. The hydraulic resistances of the individual accumulators 7 and of the feed lines are coordinated with each other; that is, the connecting line from the rail 6 to the individual accumulator 7 has the highest possible hydraulic resistance. In contrast, in the case of a conventional common rail system without individual accumulators, the hydraulic resistance between the rail 6 and the injector 8 should be as low as possible to achieve unhindered injection.

The operation of the internal combustion engine 1 is automatically controlled by an electronic control unit (ECU) 10. The electronic control unit 10 contains the conventional components of a microcomputer system such as a microprocessor, I/O components, buffers, and memory components (EEPROM, RAM). The operating data relevant to the operation of the internal combustion engine 1 are stored in the form of characteristic diagrams/characteristic curves. Using these, the electronic control unit 10 calculates the output values from the input values. FIG. 1 shows by way of example the following input variables: the rail pressure pCR, which is measured by a rail pressure sensor 9; an engine speed signal nMOT of the internal combustion engine 1; the pressure signals pE of the individual accumulators 7; a desired power output value LV specified by the operator; and an input variable IN. The input variable IN includes, for example, the signal of a knock sensor, the charge air pressure of a turbocharger, and the temperatures of the coolant/lubricant and the fuel.

In FIG. 1, a signal PWM for actuating the suction throttle 4, a signal ve, which stands for the actuating signals for driving the injectors 8, and an output variable OUT are shown as the output variables of the electronic control unit 10. The output variable OUT stands for the other actuating signals necessary for the open- and closed-loop control of the internal combustion engine 1.

Figure 2:
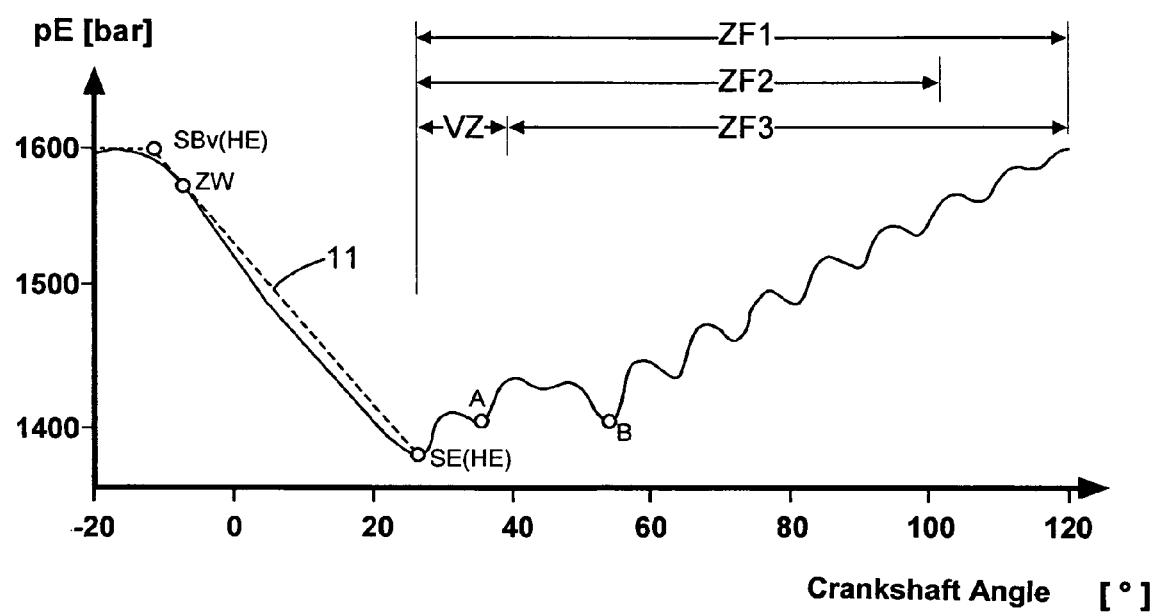
FIG. 2 shows a first injection.

FIG. 2 shows a first injection. The individual accumulator pressure pE is plotted in bars on the ordinate. The crankshaft angle is plotted on the abscissa. The individual accumulator pressure pE was measured over a measuring interval such as one operating cycle of the internal combustion engine equal to a crankshaft angle of 720° and then stored. In FIG. 2, the range from a crankshaft angle of −20° to an angle 120° of this measuring interval is plotted on the abscissa. The injection comprises a main injection in the range between a crankshaft angle of −20° and approximately 30° and a post-injection in the range beyond a crankshaft angle of approximately 30°. Although the description of the invention refers to crankshaft angles, the process can also proceed under time control, in which case a reference to a crankshaft angle is to be understood as a reference to a point in time.

After the pressure curve pE in the individual accumulator has been detected and stored during the measuring interval, the absolute minimum value of the individual accumulator pressure pE is determined from these raw values. The absolute minimum value corresponds to the end of the main injection SE(HE). Then an intermediate value, point ZW, is determined. On the basis of the end of the main injection SE(HE) and the intermediate value ZW, a mathematical function is used, shown as a straight line 11, to calculate a virtual start of the main injection SBv(HE). The exact method is described in DE 103 44 181 A1, to which reference is herewith made and the contents of which are incorporated by reference.

The mechanical closing of the injector needle at the end of the main injection SE(HE) causes considerable waviness in the individual accumulator pressure pE as a result of the feedback of pressure oscillations. It is clear from the curve in FIG. 2 that the desired signal is falsified by the hydraulic oscillations. The start and end of the post-injection therefore cannot be identified unambiguously. For example, the end of the post-injection could be at point A, but it could just as well be at point B, because it, too, represents a local minimum. According to the invention, the stored individual accumulator pressure pE is now filtered through a filter such as a comb filter within a time window in the measuring interval after the end of the main injection SE(HE). The time window starts at the end of the main injection SE(HE). The time window ends in an event-controlled manner, i.e., when the pressure level of the rail pressure pCR and the pressure level of the individual accumulator pressure pE become the same. In FIG. 2, this time window is designated by the reference symbol ZF1, the end of which is located at a crankshaft angle of 120°. Alternatively, the time window can end after the expiration of a time step T1 or of a certain crankshaft angle. In FIG. 2, this time window is designated ZF2. As yet another alternative, a delay time VZ begins at the end of the main injection SE(HE). Upon the expiration of this delay time VZ, either time window ZF1 with its event-controlled end begins or the time window ZF2 with its time-controlled end begins. In FIG. 2, the reference symbol ZF3 designates a delayed time window with an event-controlled end.

Figure 3A:
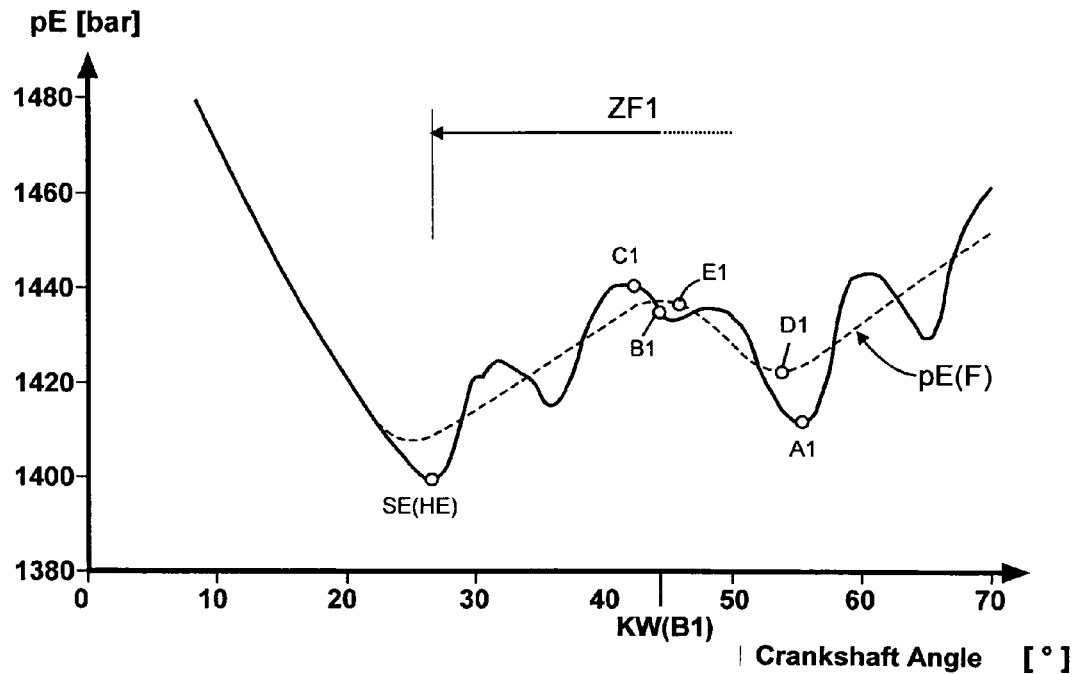
FIG. 3 shows a first (FIG. 3A) and a second post-injection (FIG. 3B)
Figure 3B:
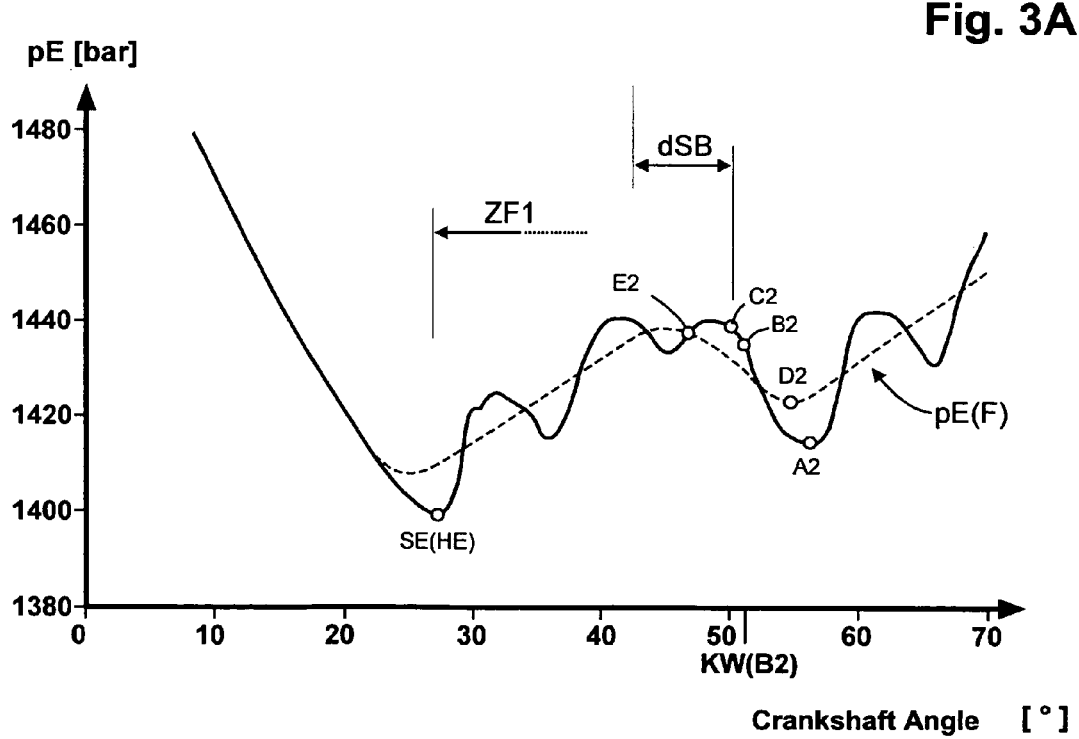

FIG. 3 consists of the two FIGS. 3A and 3B. In both figures, the crankshaft angle is plotted on the abscissa in the range from 0° to 70°, and the individual accumulator pressure pE is plotted in bars on the ordinate. The solid line characterizes the measured individual accumulator pressure pE (raw values), whereas the broken line characterizes the filtered individual accumulator pressure pE(F). The characteristics of the filter are determined by way of a Fourier transformation of the observed oscillation, by way of a model, or by way of a characteristic diagram. The input variables of the characteristic diagram are the same as the characteristics of the oscillation, e.g., the oscillation of the rail pressure pCR. The individual accumulator pressure pE shown in FIG. 3B differs from the course in FIG. 3A in that, in FIG. 3B, the start of the post-injection was initiated later by a crankshaft angle of 1°. In other words: In FIG. 3B, the pause between the initiated end of the main injection and the imitated start of the post-injection is 1° of crankshaft angle longer than the pause in FIG. 3A.

If we take the unfiltered course of the individual accumulator pressure pE as a basis, the first step is to determine the local minimum value of the individual accumulator pressure pE in the region after the end of the main injection SE(HE). We thus find point A1 in FIG. 3A and point A2 in FIG. 3B. This local minimum value is interpreted as the end of the post-injection. In the second step, the local maximum value of the individual accumulator pressure pE is looked for in the preceding range of crankshaft angles, that is, in the direction toward small values of the crankshaft angle. In both figures, the maximum value is located at approximately 1440 bars. In the third step, an intermediate value is calculated, in that a difference of 5 bars, for example, is subtracted from the maximum value of, here, 1440 bars. In FIG. 3A, therefore, the intermediate value, point B1, has the coordinates (KW(B1) 1435 bars). In FIG. 3B, the intermediate value, point B2, has the coordinates (KW(B2)/1435 bars). In the third step, a virtual start of the post-injection is calculated from the end of the post-injection and the intermediate value. In FIG. 3A, this is designated by point C1. In FIG. 3B, it is designated by point C2. A comparison of the two virtual injection starts, i.e., point C1 in FIG. 3A compared with point C2 in FIG. 3B, shows that the deviation is much greater than a crankshaft angle of 1°; that is, the results are not reproducible. In FIG. 3B, the deviation is indicated by the reference symbol dSB.

When the previously described process for determining the end of injection and for calculating the virtual start of the injection is applied to the filtered curve pE(F), we obtain point D1 (FIG. 3A) and point D2 (FIG. 3B) as the end of injection and point E1 (FIG. 3A) and point E2 (FIG. 3B) as the virtual start of injection. A comparison of the two virtual injection starts, i.e., of point E1 with point E2, shows that these deviate only slightly from each other. The inventive process is therefore characterized by high reliability; that is, the determined end of the post-injection and the virtual start of the post-injection calculated from that are clearly reproducible. The emission values are positively influenced in the sense of being reduced by this high reliability.

Figure 4:
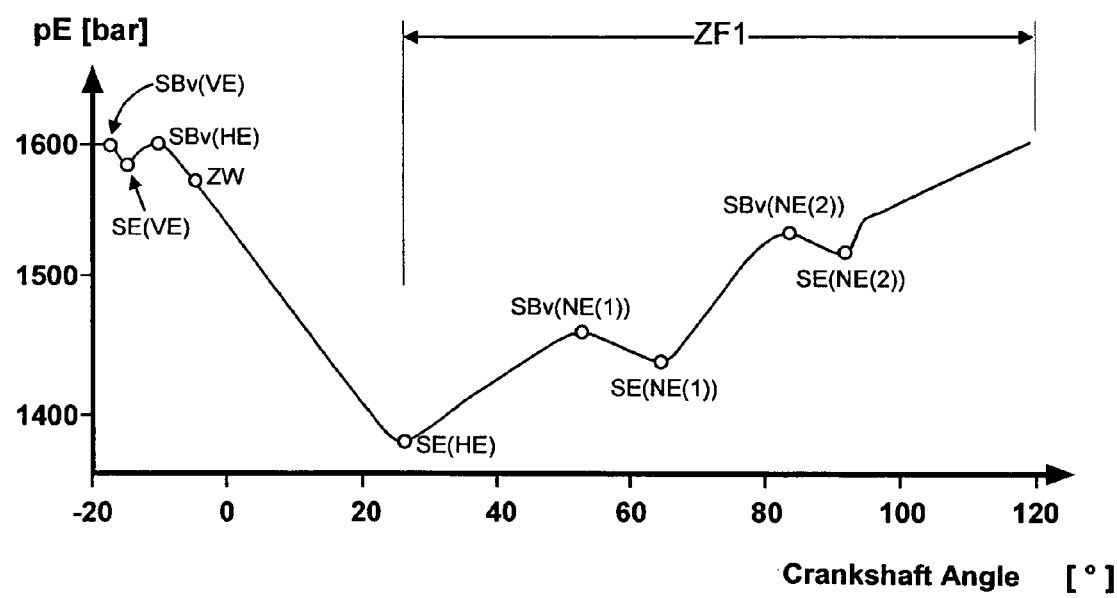
FIG. 4 shows a second injection.

FIG. 4 shows a second injection. The injection comprises a pre-injection, a main injection, and multiple post-injections (in the present case, two post-injections). The individual accumulator pressure is plotted on the ordinate. The crankshaft angle is plotted on the abscissa. In the range of the post-injections, the course of the curve corresponds to the filtered individual accumulator pressure.

In the case of multiple post-injections, the first step is to determine the end of the main injection SE(HE) from the raw values of the individual accumulator pressure pE, to calculate an intermediate value, and to calculate the virtual start SBv (HE) of the main injection. In the second step, the individual accumulator pressure pE is filtered during a time window such as time window ZF1. In the third step, the first local minimum value is determined from the filtered individual accumulator pressure pE(F) and set as the end of the first post-injection SE(NE(1)). In the fourth step, a mathematical function is used to calculate the virtual start of the first post-injection SBv(NE(1)). Then the second post-injection is determined in accordance with the third and fourth steps. In FIG. 4, the second post-injection is characterized by the end of the second post-injection SE(NE(2)) and by the virtual start of the second post-injection SBv(NE(2)). The process is repeated until all of the post-injections which have been initiated by the electronic control unit have been determined.

If, additionally, a pre-injection has been initiated, then, as previously described, the end SE(HE) and the virtual start SBv(HE) of the main injection are determined from the raw values of the individual accumulator pressure pE. Then, in the crankshaft angle range from the start of the measuring interval until the virtual start of the main injection SBv(HE), a local minimum value is determined and interpreted as the end of the pre-injection SE(VE). From this, a mathematical function is used to calculate the virtual start of the pre-injection SBv(VE).

In another embodiment (not shown), it is provided that, after the end SE(HE) and the virtual start of the main injection SBv(HE) have been determined from the raw values of the individual accumulator pressure, the individual accumulator pressure pE is filtered in the crankshaft angle range between these two points. To increase process reliability, the selected crankshaft angle range can be increased by 1°, for example. Then, the absolute minimum value is determined from the filtered individual accumulator pressure and taken as the end of the filtered main injection. From this, a mathematical function is used then to calculate the virtual start of the filtered main injection. The virtual start of the filtered main injection and the end of the filtered main injection are taken as reference points for the determination of the pre-injection, of the time window, of the delay time, and of the post-injection or post-injections.

Figure 5:
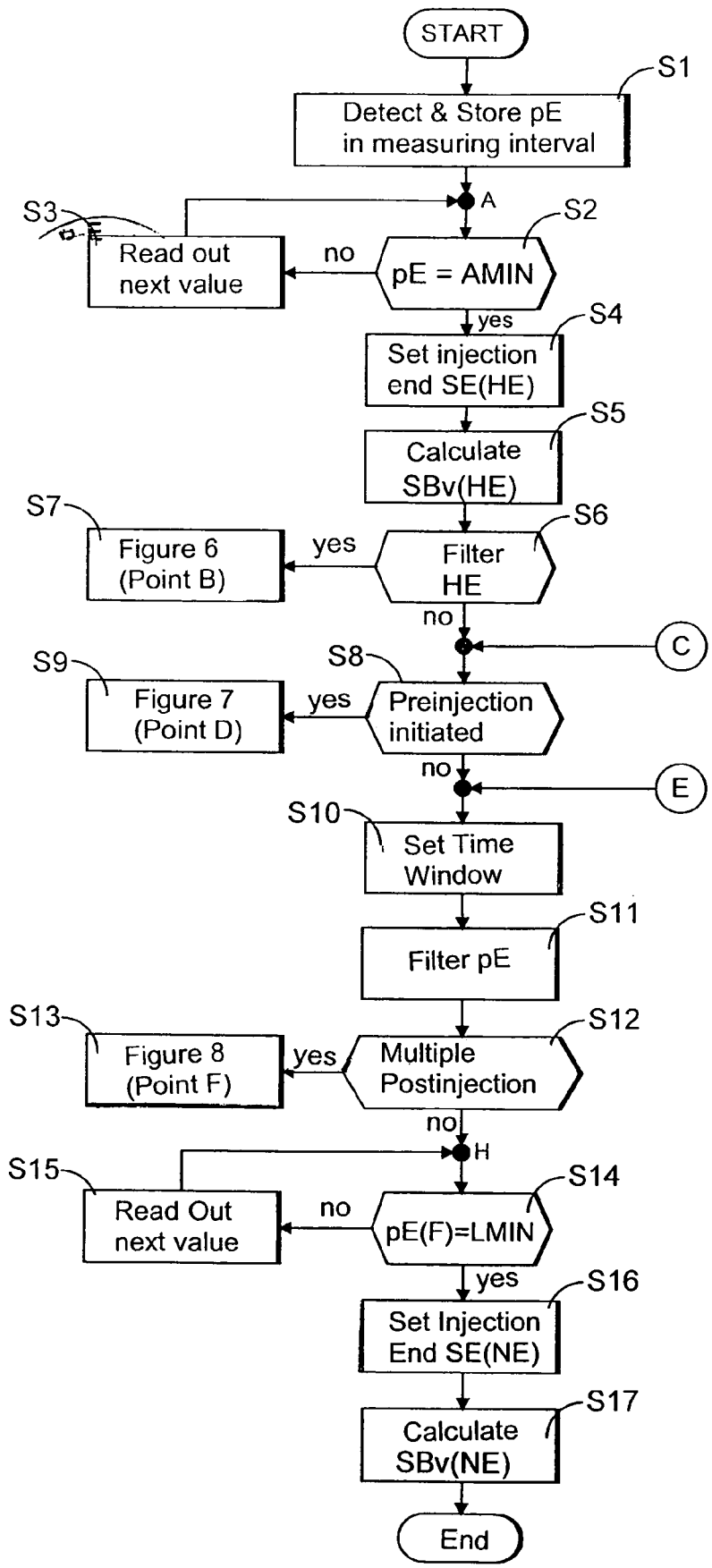
FIG. 5 shows a program flow chart.
Figure 6:
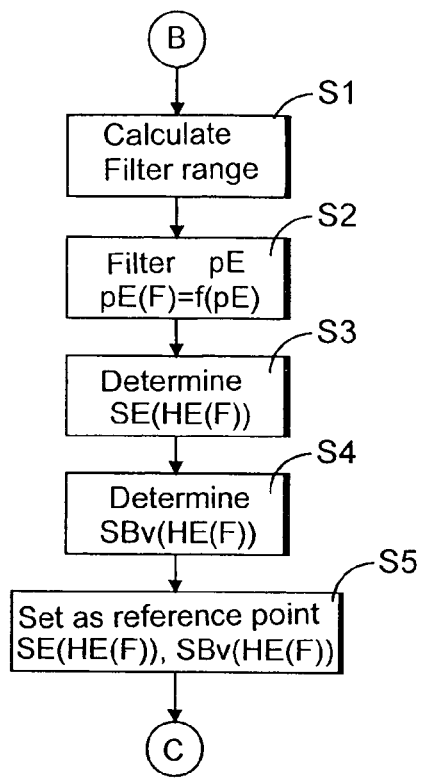
FIG. 6 shows a subroutine for a filtered main injection.
Figure 7:
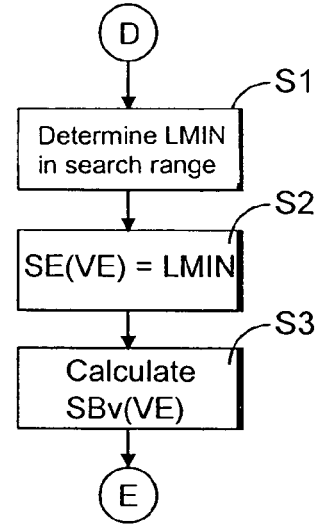
FIG. 7 shows a subroutine for a pre-injection.

FIG. 5 shows a program flow chart. At S1, the individual accumulator pressure pE is detected during a measuring interval, such as one operating cycle of the internal combustion engine (a crankshaft angle of 720°), and stored. Steps S2-S7 characterize a main injection. Steps S8 and S9 characterize a pre-injection, and steps S10-S17 characterize a post-injection or multiple post-injections. At S2, the program checks to see if the stored pressure value of the individual accumulator pE represents the absolute minimum value AMIN. If this is not so (S2 query result: no), then the next value is read out at S3, and the program returns to point A and begins with S2 again. If the check at S2 shows that the checked value is the absolute minimum value AMIN (S2 query result: yes), then at S4 the absolute minimum value AMIN is taken as the end of the main injection SE(HE). At S5, an intermediate value is calculated, and then a mathematical function such as a linear function is used to extrapolate a virtual start of the main injection SBv (HE) on the basis of the end of the main injection SE(HE) and the intermediate value. The intermediate value is calculated by seeking the maximum pressure value in the crankshaft angle range preceding the end of the main injection SE(HE), i.e., in the range of smaller crankshaft angles. If this has been determined, then either a predetermined pressure value or a relative pressure value is subtracted from it. At S6, the program checks to see whether the filtering of the main injection has been activated. If this so (S6 query result: yes), then the program branches at S7 to a subroutine, which is shown in FIG. 6 and which will be explained in conjunction with FIG. 6. If the main injection is not to be filtered (S6 query result: no), the program checks at S8 to see if the electronic control unit initiated a pre-injection within the overall injection process. If this was so (S8 query result: yes), then at S9 the program branches to a subroutine, which is shown in FIG. 7 and which will be explained in conjunction with FIG. 7. If no pre-injection was initiated (S8 query result: no), then at S10 a time window is set. After that, the individual accumulator pressure pE is filtered at S11 within the set time window (see FIG. 2) by means of a comb filter, for example.

Figure 8:
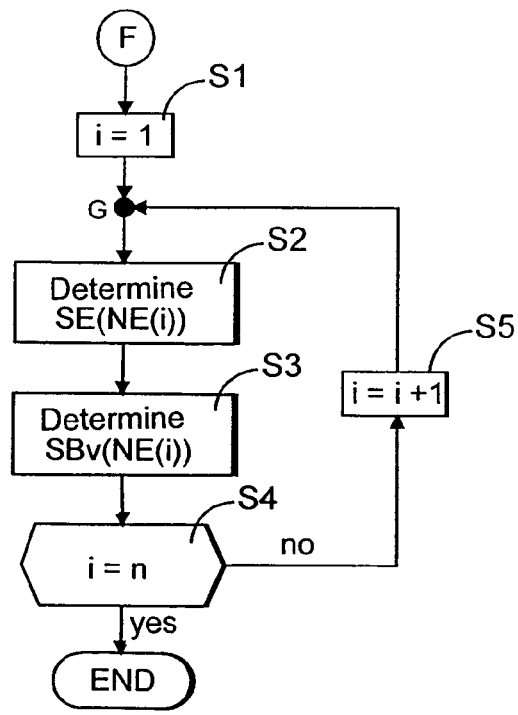
FIG. 8 shows a subroutine for multiple post-injections.

At S12, the program checks to see if the electronic control unit initiated multiple post-injections within the overall injection process. If this was the case (S12 query result: yes), then the program branches at S13 to a subroutine, which is shown in FIG. 8 and which will be explained in conjunction with FIG. 8. If no multiple post-injections were carried out (S12 query result: no), then at S14 a value of the filtered individual accumulator pressure pE(F) is read out from memory, and the program checks to see if the value represents a local minimum value LMIN. If this is not the case (S14 query result: no), then at S15 a next value is read out, and the program continues at point H. If the read-out value of the filtered individual accumulator pressure pE(F) is a local minimum value LMIN (S14 query result: yes), then at S16 this value is assigned to the end of the post-injection SE(NE). At S17, in analogy to the calculation for the main injection, an intermediate value is calculated, and a virtual start of the post-injection SBv(NE) is calculated on the basis of the end of the post-injection SE(NE). With this the program terminates.

FIG. 6 shows a subroutine for the filtering of a main injection. At S1, the range to be filtered is calculated. The filtering range corresponds to the range of crankshaft angles between the virtual start of the main injection SBv(HE) and the end of the main injection SE(HE), which were determined from the raw values of the individual accumulator pressure pE. To improve process reliability, a range limit can be set before the virtual start of the main injection SBv(HE), i.e., in the direction toward smaller crankshaft angles, and the second range limit can be set after the end of the main injection SE(HE), i.e., in the direction toward larger crankshaft angles. At S2, the filtered individual accumulator pressure pE(F) is then calculated from the raw values. At S3, the absolute minimum value is determined from the filtered individual accumulator pressure pE(F) and taken as the end of the filtered main injection SE(HE(F)). At S4, the virtual start of the filtered main injection SBv(HE(F)) is determined. At S5, the virtual start of the filtered main injection SBv(HE(F)) and the end of the filtered main injection SE(HE(F)) are taken as reference points. This means that the virtual start of the filtered main injection SBv(HE(F)) applies to the determination of the end of the pre-injection SE(VE) and to the determination of the virtual start of the pre-injection SBv(VE). The end of the filtered main injection SE(HE(F)) applies as the reference point for the time window and for the post-injection or post-injections. The subroutine ends after S5, where the subroutine branches back to point C of the main program of FIG. 5.

FIG. 7 shows a subroutine for pre-injection. At S1, the local minimum value LMIN of the individual accumulator pressure pE is determined in the crankshaft angle range from the start of the measuring interval to the virtual start of the main injection SBv(HE). At S2, this value is interpreted as the end of the pre-injection SE(VE). At S3, a virtual start of the pre-injection SBv(VE) is calculated from an intermediate value and the end of the pre-injection SE(VE). After that, the subroutine branches back to point E of the main program of FIG. 5.

FIG. 8 shows a subroutine for multiple post-injections. At S1, a running variable i is set to 1. The absolute value of the running variable i corresponds to the number of executed post-injections. At S2, a local minimum value is determined, and this is interpreted as the end of the i-th post-injection SE(NE(i)). On the first run, this is the end of the first post-injection SE(NE(1)); see FIG. 4. At S3, the associated virtual start of the i-th post-injection SBv(NE(i)) is calculated. On the first run, this is the virtual start of the first post-injection SBv(NE(1)); see FIG. 4. At S4, the program checks to see if the running variable i has reached the end value n. If this is not the case (S4 query result: no), then at S5 the value of the running variable is increased by 1; the program branches to point G; and step S2 is executed for the next post-injection. If the end value n has been reached (S4 query result: yes), the program run terminates.

Although the present invention has been described in relation to particular embodiments thereof, many other variations and modifications and other uses will become apparent to those skilled in the art. It is preferred, therefore, that the present invention be limited but by the specific disclosure herein, but only by the appended claims.

The invention claimed is:

1. A process for open- and closed-loop control of an internal combustion engine with a common rail system including individual accumulators, comprising the steps of:
   detecting and storing individual accumulator pressure (pE) within a measuring interval;
   interpreting an absolute minimum value of the stored individual accumulator pressure (pE) as an end of the main injection (SE(HE));
   calculating a virtual starting time for the main injection (SBv(HE)) based of the end of the main injection (SE(HE)), using a mathematical function;
   filtering the individual accumulator pressure (pE) within a time window in a measuring interval after the end of the main injection (SE(HE));
   interpreting a local minimum value of the filtered individual accumulator pressure (pE(F)) as the end of a post-injection (SE(NE)); and
   calculating a virtual start of the post-injection (SBvNE)) using a mathematical function.

2. A process according to claim 1, wherein the time window (ZF1) starts with the end of the main injection (SE(HE)) and ends when the individual accumulator pressure (pE) becomes equal to rail pressure (pCR).

3. A process according to claim 1, wherein the time window (ZF1) starts with the end of the main injection (SE(HE)) and ends upon expiration of a time step (T1).

4. A process according to claim 1, wherein a delay time (VZ) starts at the end of the main injection (SE(HE)), and the time window (ZF3) starts upon expiration of the delay time (VZ) and ends when the individual accumulator pressure (pE) becomes equal to the rail pressure (pCR).

5. A process according to claim 1, wherein a delay time (VZ) starts at the end of the main injection (SE(HE)), and the time window starts upon expiration of the delay time (VZ) and ends upon expiration of a time step (T1).

6. A process according to claim 1, further including determining, in correspondence with a number ((i), i=1, 2 . . . n) of the initiated multiple post-injections, the corresponding ends of the post-injections (SE(NE(i)) from the filtered individual accumulator pressure (pE(F)), and calculating the virtual starts (SBv(NE(i)) of the post-injections within the time window.

7. A process according to claim 1, wherein, upon an initiated pre-injection in the crankshaft angle range between the start of the measuring interval and the calculated virtual start of the main injection (SBv(HE)), a local minimum of the individual accumulator pressure (pE) is interpreted as the end of the pre-injection (SE(VE)), and a mathematical function is used to calculate a virtual start of the pre-injection (SBv(VE)).

8. A process according to claim 1, including determining the individual accumulator pressure (pE) using an adjustable filter having characteristic values determined by way of a Fourier transformation, a model, or a characteristic diagram.

9. A process according to claim 1, wherein, after an end (SE(HE)) and a virtual start (SBv(HE)) of the main injection have been calculated from the unfiltered individual accumulator pressure (pE), the individual accumulator pressure (pE) is filtered in a crankshaft angle range between the virtual start of the main injection (SBv(HE)) and the end of the main injection (SE(HE)), an absolute minimum value of the filtered individual accumulator pressure (pE(F)) within the range is interpreted as the end of the filtered main injection (SE(HE(F))), and a mathematical function is used to calculate a virtual start of the filtered main injection (SBv(HE(F))).

10. A process according to claim 9, wherein the individual accumulator pressure (pE) is filtered in an enlarged crankshaft angle range.

11. A process according to claim 9, wherein the virtual start of the filtered main injection (SBv(HE(F))) is taken as a reference point, in the determination of the end of the pre-injection (SE(VE)), and the end of the filtered main injection (SE(HE(F))) is taken as the reference point in the determination of the post-injection or post-injections.

* * * * *